United States Patent Office 3,349,921
Patented Oct. 31, 1967

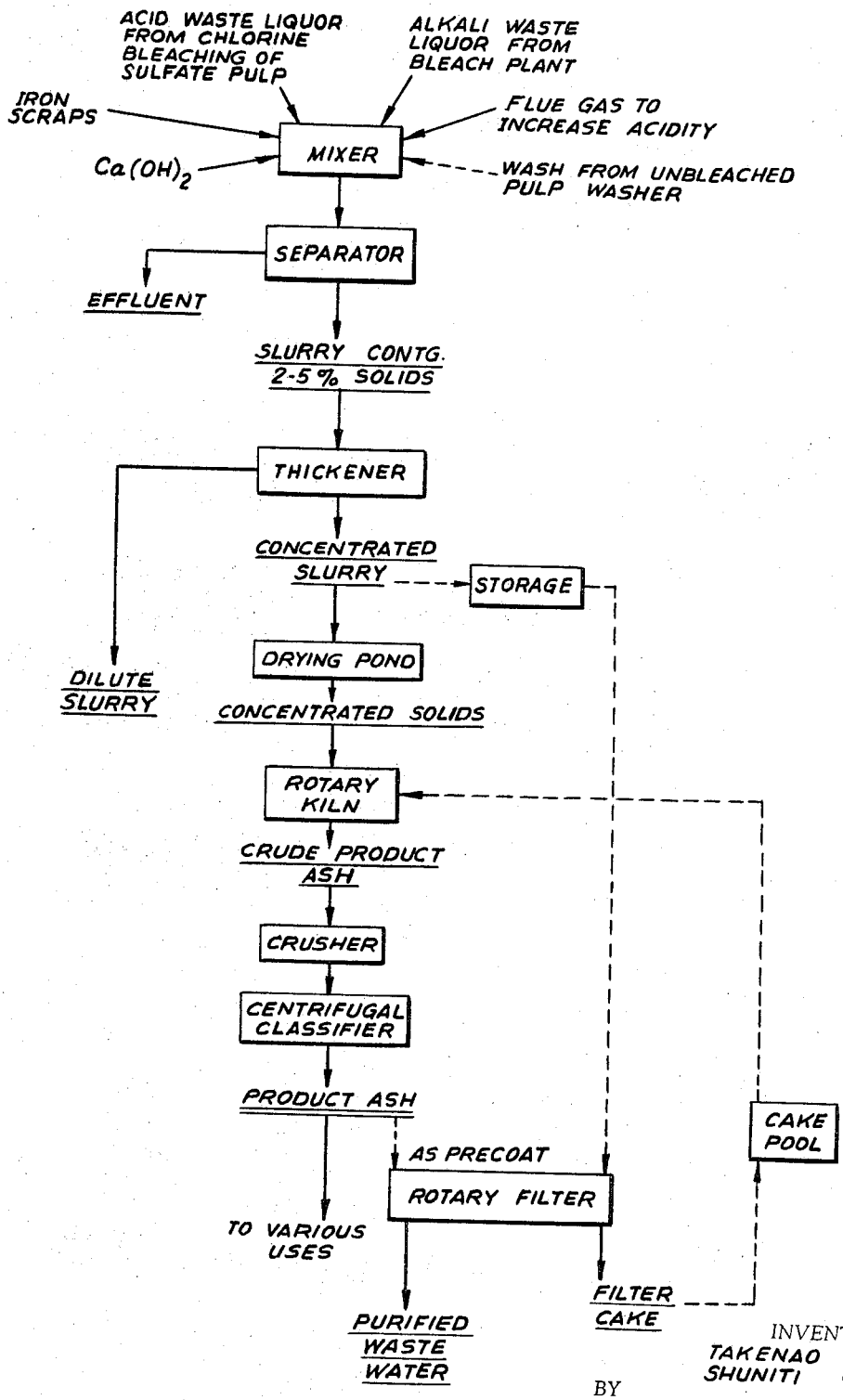

3,349,921
PROCESS FOR CONVERTING SULFATE PUMP WASTE RESIDUES INTO HIGH UTILITY MATERIAL AND MEANS OF APPLYING SAME
Takenao Niwa and Shuniti Ozaki, both of 1 Oji-machi, Aichi, Kasugai-shi, Japan
Continuation of application Ser. No. 441,816, Mar. 22, 1965. This application May 31, 1966, Ser. No. 554,206
Claims priority, application Japan, Apr. 1, 1961, 36/11,682
7 Claims. (Cl. 210—509)

ABSTRACT OF THE DISCLOSURE

The invention relates to the processing of waste liquor as it is obtained in the bleaching of sulfate pulp. The raw pulp is treated in a first stage with chlorine and thereafter water washed, thereby yielding a first acidic waste liquor. The pulp is then treated in a second alkaline stage which includes water washing thereby resulting in a second waste liquor of alkaline pH value. In accordance with the invention, both liquors referred to are purified to produce a new product in the form of an ash which serves as a filter aid and which has decolorizing properties.

Generally, the processing of the two waste liquors consists of the following steps:

(1) Iron in the form of an ionizable ferrous salt is incorporated in the acidic liquor;

(2) The alkaline waste liquor together with lime is then added to the liquor obtained according to 1;

(3) The precipitate formed thereby is then filtered off; the precipitate includes the floc which is produced by the ferric hydroxide in turn formed by the reaction of the dissolved iron salt of step 1; and (4) The precipitate is then burned at a temperature of from 600–900° C. whereby the ash is obtained.

According to a modification, the ash may be subsequently ground and classified.

---

This is a continuation of application Ser. No. 441,816, now abandoned, which in turn was a continuation-in-part of Ser. No. 182,571, now abandoned.

The present invention relates primarily to the treatment of waste liquors from the bleaching of sulfate pulp. In the bleaching of sulfate pulp, it is common practice to alternate one or more chlorine treatments which are on the acid side, with alkali treatments, the chief purpose of which is to dissolve out the lignin and other matters made soluble by the previous chlorine treatment. We have now discovered that such waste liquors which are highly colored, and difficult to dispose of (for example, they are destructive of marine life when added to harbors, rivers, etc.), can be profitably utilized by converting them into an improved filter aid in the form of an ash and a disposable effluent. The ash in turn, may be used to filter slurries formed in the treatment of the waste liquor or liquors started with.

The primary object of the present invention is, therefore, to convert such waste liquors as well as liquors associated with the cooking of the pulp, as for example, the effluent from the unbleached pulp washer, into a valuable product useful not only as a filter aid, but as a decolorizing material of general utility. It may also have other uses, as for example, as a pigment, and as an ingredient of cement of various types.

A still further object is to provide an improved process of treating such waste liquors by the use of the filtering and decolorizing material first obtained.

Other objects of our invention, and the advantages thereof, will be apparent from the following detailed description, taken with the accompanying drawing consisting of a flow sheet of the improved process.

In carrying out our invention, we provide a suitable vat or tub providing with a mixing device into which various of the waste liquors or effluents are first treated. First we convey thereto the acid liquor resulting from the treatment of the sulfate pulp with aqueous chlorine and the wash waters therefrom, all of which are on the acid side. Secondly, by way of increasing the acidity thereof, we preferably pass through the accumulated liquors flue gas which, because of its carbon dioxide content, will increase their acidity still further. Thirdly, we add iron scraps, some of the iron dissolving in the acid to produce ferrous ions. (Or instead a suitable amount of ferrous sulfate may be added.) Then in the same or a separate mixer we introduce the alkaline waste effluent from the second bleaching stage wherein the chlorine-treated pulp is acted on by an alkali wash, this effluent likewise being colored and difficult to dispose of. Mixing having taken place, the aqueous mixture is additioned with slaked lime to produce ferrous hydroxide which by air oxidation is converted to ferric hydroxide which serves to flocculate and settle the colloidal organic particles that are present, and which are responsible for much of the color of the various effluents and to the difficulty of disposing of them. The produced floc is then separated from the remaining effluent and passed to a thickener. While the proportions of the various effluents thus far described are not critical, the slurry of the floc leaving the separator usually runs from about 2% to about 5% solids, with the ratio of iron to organic matter believed to be about 1:3 or 1:4. Its further properties are as follows:

Specific gravity _____ about 1.0
pH _____ 11.2 to 11.4
Color of supernatant liquid, ° C. _____ 120 to 130
Temperature of the liquid, ° C. _____ 18 to 20

The thickened slurry is then passed to a drying pond or other suitable place, where it is exposed to the air for a sufficient length of time to remove as much of the water content as possible. Thereupon, the substantially dried material is passed to a rotary kiln where it is heated in the presence of air and burned to ash. Sufficient organic matter is present to enable combustion to take place unaided. The preferred temperature range of the burning is from 600 to 900° C. The product of the combustion is a dark brown ash in powdery form, and this output of the kiln will hereinafter be referred to as crude product ash, or upon grinding and classifying, as product ash. If a combustion temperature is maintained substantially below 600° C. the ash will contain unburned organic material which will impair its quality, while a temperature appreciably above 900° C. will result in fusing of the iron and the production of clinkers which will also impair the quality of the product.

The crude product ash issuing from the kiln is not uniform in particle size; therefore, it is passed through a crusher, and thereafter to a centrifugal classifier and screened, and if desired all particles coarser than 60 mesh and finer than 200 mesh rejected. This is because particles courser than 60 mesh do not give the optimum filtering action while particles considerably smaller than 200 mesh give a filtering action that is too slow for most purposes. The following is an analysis of a typical specimen of the screened product ash:

| | |
|---|---|
| Metals as $Fe_2O_3 + Al_2O_3$ | percent 43 |
| Calcium as CaO | percent 32 |
| Ignition losses (chiefly CO) | percent 16 |
| Water content | percent [1] 1.5 |
| Color | Black brown |
| Specific gravity | 2.9 |
| Bulk specific gravity | 0.8 |
| pH | 10.5 to 11 |

[1] Or above.

Distribution of the product ash particles varies to some extent with the type of crushing process employed. A typical example is given below:

| | Percent |
|---|---|
| 60 to 100 mesh | 24 |
| 100 to 200 mesh | 22 |
| Above 200 mesh | 54 |

The product ash upon treatment with concentrated hydrochloric acid, dissolves to the extent of about 30 to 50%; it is insoluble in alkali. In its filter aid properties, our improved product, as will be evident hereinafter, compares favorably with diatomaceous earth which is widely used for this purpose.

It is a feature of our invention, as above mentioned, to utilize the product ash directly in the concentration of the waste liquors above mentioned, including the wash water from the unbleached pulp washer. This gives rise to a cyclic process and to the presence of the new effluent, i.e., that from the unbleached pulp washer, and the return of certain of the products to the main process, as indicated by dotted lines in the flow sheet.

This use of the product ash will be apparent from the following description of a typical example.

*Example*

The product ash is precoated on the filtering element of a rotary filter, as indicated, preferably to a depth of about 10 mm., using a precoat rate of 8 kg. per square meter of filtering area per hour. Then the concentrated slurry from the thickener, some of which may be held in storage as indicated, is passed through the filter, the filter cake doctored off in the unusual manner, and dropped into a cake pool whence it is conveyed to the rotary kiln, as shown.

Thereby the filtrate leaves the rotary filter clarified, free of solids and odors, and may be disposed of without difficulty. Listed below are the results of testing the product on a pilot testing machine to determine its suitability as a filter aid.

The slurry from the thickener whose properties are given above is highly viscous and difficult to filter without the aid of the product ash. Experiments have further shown that the presence of carbon and lime in the product ash aids in its decolorizing power, particularly as regards the concentrated slurry. Thus the color of such slurry of about 120 to 130° above mentioned, is brought down to the range of 10 to 20°, while yielding a treated liquor substantially free of solids. This is in contrast to diatomaceous earth, whose decolorizing properties are considerably inferior—see items F and J of the above table.

As will be evident from the foregoing, the new process enables the waste liquors mentioned to be converted from their difficulty disposable form into a usable solid product of value, and a purified readily disposable effluent.

While a specific embodiment of the invention has been shown and described in detail to illustrate the application of the inventive principles, it will be understood that the invention may be embodied otherwise without departing from such principles.

What is claimed is:

1. In the bleaching of sulfate pulp wherein the raw pulp is treated in a first stage with chlorine, thereafter water washed, such treatment resulting in a first waste liquor which is acid, said pulp being then treated in a second, alkaline stage including water washing which results in a second waste liquor which is alkaline from the alkali present therein, the process of treating both said waste liquors to purify same and to produce therefrom a new product in the form of an ash serving as a filter aid with decolorizing properties, consisting in the following steps:

(1) treating said acid liquor by incorporating therein iron in the form of an ionizable ferrous salt,
   (2) then adding thereto said alkaline waste liquor together with lime,
   (3) filtering off the precipitate formed from the reaction of the ingredients of the above mixture, including the floc produced by the ferric hydroxide formed by the reaction of the dissolved iron salt present by operation of step (1) above and the alkali and air present,
   (4) burning said precipitate at a temperature of from 600–900° C., thereby forming said ash.

2. The process according to claim 1, including the further step of grinding and classifying said ash.

3. The process according to claim 1, in which a portion of said ash is used as the filter aid in step (3).

| A | B | C | D | E | F | G | H | J |
|---|---|---|---|---|---|---|---|---|
| 2.0 | 60 | 0.158 | 6–10 | 63 | 15 | | $28 \times 10^{10}$ | Product ash. |
| 3.0 | 60 | 0.143 | 6–10 | 57 | 10 | | $28 \times 10^{10}$ | Do. |
| 4.0 | 60 | 0.130 | 6–10 | 67 | 10 | $16 \times 10^{11}$ | $28 \times 10^{10}$ | Do. |
| 5.0 | 60 | 0.136 | 6–10 | 64 | 15 | | $28 \times 10^{10}$ | Do. |
| 2.0 | 30 | 0.120 | 3–5 | 69 | 10 | | $28 \times 10^{10}$ | Do. |
| 3.0 | 30 | 0.102 | 3–5 | 60 | 10 | | $28 \times 10^{10}$ | Do. |
| 4.0 | 30 | 0.103 | 3–5 | 68 | 10 | $16 \times 10^{11}$ | $28 \times 10^{10}$ | Do. |
| 5.0 | 30 | 0.100 | 3–5 | 67 | 20 | | $28 \times 10^{10}$ | Do. |
| 2.0 | 30 | 0.133 | 3–5 | 69 | 120 | | | Diatomaceous earth I. |
| 5.0 | 30 | 0.100 | 3–5 | 68 | 130 | | | Do. |
| 4.0 | 30 | 0.106 | 3–5 | 75 | 120 | | | Diatomaceous earth II. |

NOTE.—A=Concentration of Sludge (percent); B=Drum Rotation (r.p./hr.); C=Treatment Velocity (m.³/m.²/hr.); D=Precoat Consumption (mm./hr.); E=Water Content in the Cake (percent); F=Color Degree [2] of Filtered Solution; G=Ruth's Specific Resistance (m./kg.); H=Ruth's Resistance Coefficient of Filter Medium; J=Types of Filter Materials.

[2] As per Testing Standards of Japan Water and Sewage Institute.

In the above test, the product ash was precoated to a thickness of 70 mm.

The operating conditions employed were as follows:

| | |
|---|---|
| Drum dimensions of test filtering machine | 325 mm. $\phi$ x 450 mm. L. |
| Filtering pressure (vacuum) | −400 to 500 mm. Hg. |
| Filter cloth | 201A nylon |
| Precoat thickness | 68 mm. to 15 mm. |

4. The process according to claim 1, including an additional step (5) of adding a waste liquor from the washing of unbleached sulfate pulp to the said first and second liquors from said bleaching of sulfate pulp.

5. The process according to claim 1, in which the iron salt called for in step (1) is obtained by adding metallic iron to the acid liquor from the chlorine bleaching.

6. The product of the process according to claim 1, said product consisting substantially of metal oxides calculated as ferric oxide plus aluminum oxide, and lime, and further having a specific gravity of approximately 2.9 and a pH of 10.5 to 11.

7. The product of the process according to claim 4, said product consisting substantially of metal oxides calculated as ferric oxide plus aluminum oxide, and lime, and having a specific gravity of approximately 2.9 and a pH of 10.5 to 11.

No references cited.

LEON D. ROSDOL, *Primary Examiner.*

M. WEINBLATT, *Assistant Examiner.*